United States Patent [19]

Sakamoto et al.

[11] 4,338,283
[45] Jul. 6, 1982

[54] FLUIDIZED BED COMBUSTOR

[75] Inventors: Koya Sakamoto; Yutaka Yoneda; Naoki Fujiwara; Shigehito Takamoto, all of Kure, Japan

[73] Assignee: Babcock Hitachi Kabushiki Kaisha, Tokyo, Japan

[21] Appl. No.: 137,529

[22] Filed: Apr. 4, 1980

[51] Int. Cl.³ .................. G05D 16/00; F27B 15/00; F23C 11/02
[52] U.S. Cl. .................. 422/112; 422/141; 422/144; 422/145; 423/244; 431/7; 431/170; 432/15; 432/58
[58] Field of Search .............. 422/141, 144, 145, 112; 431/7, 170; 432/15, 58; 423/244 A

[56] References Cited

U.S. PATENT DOCUMENTS 4,152,393  5/1979  Callahan et al. ............ 422/144
4,197,285  4/1980  Lang et al. ................. 423/244 A

FOREIGN PATENT DOCUMENTS 55-44363  3/1980  Japan ....................... 422/141

*Primary Examiner*—Barry S. Richman
*Attorney, Agent, or Firm*—Thomas E. Beall, Jr.

[57] ABSTRACT

A fluidized bed combustor wherein a combustion chamber and a regeneration chamber are both contained in a single hollow body is provided. These two chambers are formed by vertically partitioning the body by a partition wall, which has an upper opening and a lower one, and also each have a perforated plate at the bottom part thereof on which a heat transfer medium containing a desulfurizing agent is placed and fluidized. The desulfurizing agent is transferred from the combustion chamber through the lower opening to the regeneration chamber and circulated by overflow through the upper opening again to the combustion chamber. Various modifications of the above-mentioned fundamental embodiment are proposed. Combustion and desulfurization are automatically and effectively carried out in a single apparatus to give a high percentage desulfurization, make an apparatus compact, and reduce an initial cost and a running cost thereof.

6 Claims, 14 Drawing Figures

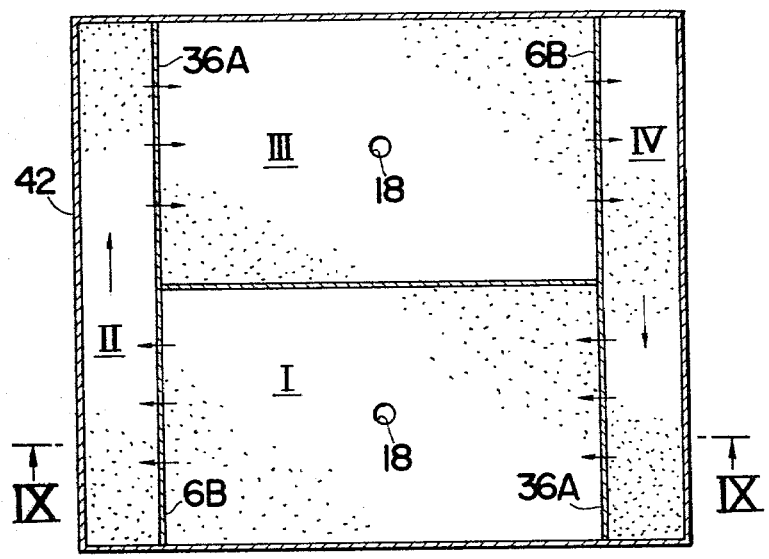
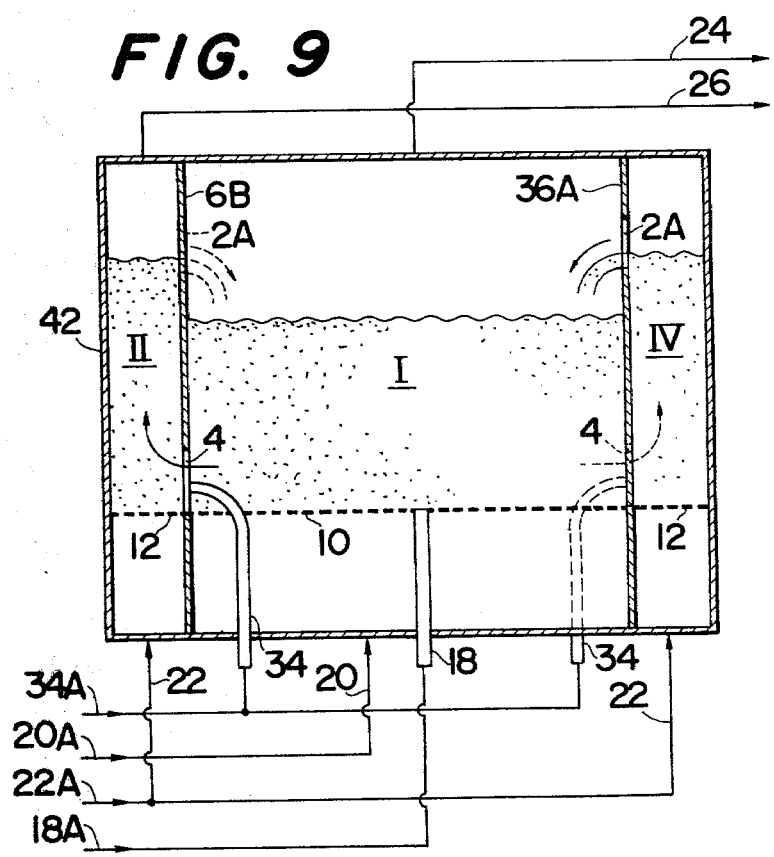

FLUIDIZED BED COMBUSTOR

BACKGROUND OF THE INVENTION

1. Field of the Invention

The present invention relates to a fluidized bed combustor, and particularly it relates to a fluidized bed combustor wherein a desulfurizing agent is mixed as a fluidized heat transfer medium and desulfurization of a combustion gas is carried out.

2. Description of the Prior Art

In conventional fluidized bed combustors, particles of heat transfer medium such as sand or cement particles are fluidized in a combustion chamber to form a fluidized bed, and a fuel such as coal, heavy oil, etc. is fed into the fluidized bed and burnt therein. When it is used for a boiler, a heat transfer tube through which water passes is arranged in the fluidized bed, and combustion heat generated in the fluidized bed is transmitted to the water inside the heat transfer tube.

Since coal or heavy oil employed as the fuel in the fluidized bed combustor has generally a high content of sulfur, it is necessary to remove sulfur oxides such as sulfur dioxide from the resulting combustion gas. Thus a desulfurizing agent such as limestone is usually blended therewith in the fluidized bed. The particles of such desulfurizing agent also function as a heat transfer medium. In the case where limestone is employed as a desulfurizing agent, it is decarbonated at high temperatures to form quick lime (CaO), which absorbs sulfur dioxide gas as shown by the following equation to effect desulfurization:

$$CaO + SO_2 + \tfrac{1}{2}O_2 \rightarrow CaSO \qquad (1)$$

Calcium sulfate formed by the desulfurization is sent together with the heat transfer medium to a regenerating furnace, where they are contacted with a reducing gas to effect regeneration, and then recycled to the fluidized bed in the combustor. In the case where carbon monoxide is used as a reducing agent, the reaction is expressed by the following equation (2):

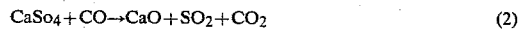

$$CaSo_4 + CO \rightarrow CaO + SO_2 + CO_2 \qquad (2)$$

However, in the above-mentioned conventional fluidized bed combustor, since the combustor and the regenerating furnace are arranged separatedly, there are such disadvantages that the initial cost increases, and a circulating pipeline for transferring the fluidized medium containing the desulfurizing agent from the combustor to the separate regenerating furnace and then returning the desulfurizing agent regenerated therein to the combustor, and a power for supplying the above-mentioned medium, are required.

SUMMARY OF THE INVENTION

A general object of the present invention is to provide a fluidized bed combustor wherein a combustion chamber is arranged adjacently to a regeneration chamber for regenerating a used desulfurizing agent, and the desulfurizing agent is circulated through the openings of a partition wall provided therebetween, whereby desulfurization of a combustion gas and regeneration of the desulfurizing agent are automatically carried out inside a single apparatus.

Another object of the present invention is to provide a fluidized bed combustor wherein the combustion gas is fully contacted with the desulfurizing agent, and desulfurization of the combustion gas and regeneration of the desulfurizing agent are efficiently carried out without causing any shortcircuiting of the desulfurizing agent when it is circulated between the combustion chamber and the regeneration chamber.

A further object of the present invention is to provide a fluidized bed combustor, wherein combustion, desulfurization, and regeneration are separately carried out under the inhibition of nitrogen oxides ($NO_x$) from generating, to give a high percentage desulfurization, and a method for operating same.

A still further object of the present invention is to provide a fluidized bed combustor, wherein the combustion is carried out in a plurality of fluidized beds in a reducing atmosphere as well as an oxidizing atmosphere, and a gas for regenerating the desulfurizing agent can be generated by a partial combustion of the fuel in the reducing atmosphere in a single apparatus, and a method for operating same.

Other objects of the present invention will be apparent from the descriptions below.

In accordance with the present invention, there is provided a fluidized bed combustor which comprises: a hollow body containing a combustion chamber and a regeneration chamber formed by vertically partitioning said hollow body by a partition wall; a perforated plate provided at the bottom of said combustion chamber and a perforated plate provided at the bottom of said regeneration chamber; a heat transfer medium containing a desulfurizing agent to be fluidized, arranged on each of said perforated plates; a means for feeding a fuel to said combustion chamber; a means for feeding air for combustion and fluidization to said combustion chamber; a means for feeding a gas for regeneration and fluidization to said regeneration chamber; Optional heat transfer tubes for steam generation, arranged inside at least one of said combustion chamber and said regeneration chamber; a gas-discharging port provided at the upper part of said combustion chamber and a gas-discharging port provided at the upper part of said regeneration chamber; said partition wall having an upper opening and a lower opening; said lower opening being located in the vicinity of said perforated plates; a means for transferring said heat transfer medium from said combustion chamber through said lower opening to said regeneration chamber; and said upper opening being located above the level of a fluidized bed to be formed in said combustion chamber so that said heat transfer medium containing a desulfurizing agent can overflow through said upper opening and recycle from said regeneration chamber to said combustion chamber.

In accordance with the present invention, there is also generally provided a fluidized bed combustor which comprises: a hollow body containing a plurality of chamber units formed by vertically partitioning said hollow body by a plurality of partition walls; each of said units consisting of a combustion chamber and a regeneration chamber, formed by vertically partitioning each of said units by a partition wall and alternately arranged in said units, and being provided with a perforated plate at the bottom of said combustion chamber and a perforated plate provided at the bottom of said regeneration chamber, a heat transfer medium containing a desulfurizing agent to be fluidized on each of said perforated plates, a means for feeding a fuel to said combustion chamber, a means for feeding air for combustion and fluidization to said combustion chamber, a means for feeding a gas for regeneration and fluidization to said regeneration chamber, optional heat transfer tubes for steam generation, arranged inside at least one of said combustion chamber and said regeneration chamber, a gas-discharging port provided at the upper part of said combustion chamber and a gas-discharging port provided at the upper part of said regeneration chamber, and a lower opening provided on said partition wall between said combustion chamber and said regeneration chamber; an upper opening provided on said partition wall between said regeneration chamber in one of said units and said combustion chamber in an adjacent unit thereto; said lower opening being located in the vicinity of said perforated plates; a means for transferring said heat transfer medium containing a desulfurizing agent from said combustion chamber through said lower opening part to said regeneration chamber; and said upper opening being located above the level of a fluidized bed to be formed in said combustion chamber so that said heat transfer medium containing a desulfurizing agent in said regeneration chamber in one of said units can overflow through said upper opening and be transferred to said combustion chamber in an adjacent unit thereto.

BRIEF DESCRIPTION OF THE DRAWINGS

FIG. 8 is a plain sectional view of another embodiment of the combustor in accordance with the present invention wherein a desulfurizing agent is self-circulated between a combustion chamber and a regeneration chamber to form a closed loop of flow thereof.

FIG. 9 is a sectional view taken along the lines IX—IX of FIG. 8.

DESCRIPTION OF THE PREFERRED EMBODIMENTS

The present invention will be mentioned in more detail referring to the accompanying drawings.

Figure 1:
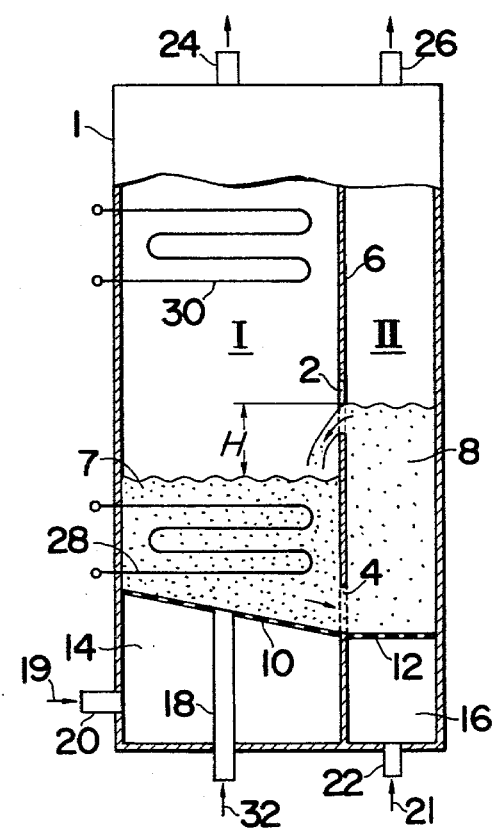
FIG. 1 is an elevational section view of a fundamental embodiment of a fluidized bed combustor in accordance with the present invention.

In FIG. 1, a hollow body is partitioned vertically by a partition wall 6 to form a combustion chamber I and a regeneration chamber II. The partition wall 6 is provided with an opening 2 at its upper part and an opening 4 at its lower part. Further, the combustion chamber I is provided with a perforated plate 10 on which a fluidized bed 7 is formed, and similarly the regeneration chamber II is provided with a perforated plate 12 on which a fluidized bed 8 is formed. Beneath the chambers are formed gas boxes 14 and 16, respectively. The perforated plate 10 it so fixed that is descends to the opening 4 at the lower part of the partition wall 6. A fuel feed pipe 18 is opened to the combustion chamber I. Further, a feed pipe 20 for combustion air 19 is connected to the gas box 14, while a feed pipe 22 for regeneration gas 21 is connected to the gas box 16. Gas discharge pipes 24 and 26 are fixed to the top parts of the combustion chamber I and the regeneration chamber II, respectively. Heat transfer tubes 28 and 30 are arranged in the fluidized bed 7 and in a free space thereabove in the combustion chamber, respectively. A heat transfer medium and a desulfurizing agent are fluidized in the combustion chamber I to form the fluidized bed 7 by introducing air into the chamber I through the perforated plate 10. The level of the fluidized bed 7 is controlled to be located below the lower end of the opening 2.

In the combustion chamber I, a fuel 32 is fed through the pipe 18 into the fluidized bed 7 and burnt by the air 19 fed through the pipe 20. The resulting combustion heat is transmitted to the heat transfer tubes 28 and 30. At the same time, sulfur oxides contained in the combustion gas reacts with the desulfurizing agent (CaO) to form calcium sulfate (gypsum), as shown in the above-mentioned equation (1). At that time, the molecular weight of the particle component of the desulfurizing agent increases from 56 of CaO to 136 of $CaSO_4$ and also its specific gravity increases. The difference in the specific gravity between CaO and $CaSO_4$ causes a separating action in the fluidized bed 7, and as a result, particles of $CaSO_4$ having a higher specific gravity descend towards the lower part of the fluidized bed 7 by gravity and reach the perforated plate 10. Since this perforated plate 10 is inclined downwardly towards the opening 4 of the regeneration chamber II, as mentioned above, the medium containing $CaSO_4$, in the fluidized bed descends along the perforated plate 10 and is transferred into the regeneration chamber II. In the regeneration chamber II, the heat transfer medium containing the desulfurizing agent is fluidized by a regenerating gas introduced through the pipe 22 and then the perforated plate 12, and in this fluidized bed 8, $CaSO_4$ particles having a higher specific gravity react with the regenerating gas and are converted to CaO particles having a lower specific gravity, as shown in the equation (2). Particles of the desulfurizing agent thus reacted with the regenerating gas move to the upper part of the fluidized bed 8 by gravity, overflow through the upper opening 2, and return into the combustion chamber I. For transferring the desulfurizing agent from the combustion chamber I to the regeneration chamber II, for example, a head H necessary for the overflow may be formed by increasing the pressure in the gas box 16 to such an extent that the desulfurizing agent does not cause any backflow through the opening part 4 towards the combustion chamber I, and also by making the gas velocity in the fluidized bed of the regeneration chamber II higher than that in the fluidized bed of the combustion chamber I. The above-mentioned circulation flow of a desulfurizing agent is automatically carried out as far as the desulfurization reaction and the regeneration reaction are both carried out in the fluidized state.

The heat transfer medium used in the present invention is selected from the group consisting of sand, limestone, quick lime, slaked lime, dolomite, magnesium carbonate, magnesium oxide, cement clinker and mixtures thereof. Further, the desulfurizing agent of the present invention is selected from the group consisting of limestone, quick lime, slaked like, dolomite, magnesium carbonate, magnesium oxide, cement clinker and mixtures thereof. The average diameter of the particles of the above heat transfer medium or desulfurizing agent is in the range of 0.8 mm to 1.5 mm, for example.

The temperature of the fluidized bed in the combustion chamber is selected from 500° C. to 1200° C. depending upon the properties of the fuel and the desulfurizing agent to be employed. As for the fuel, coal, heavy oil, sludge, waste or the like may be used. The temperature of the fluidized bed in the regenerating chamber is from 750° C. to 950° C., for example, where gypsum (calcium sulfate) is decomposed to quick lime (calcium monoxide) according to the above-mentioned equation (2). As for the gas for regeneration of a desulfurizing agent or medium, a reducing gas such as carbon monoxide, hydrogen, steam, air, and the mixtures thereof can be employed.

In the embodiment, in FIG. 1, the movement of the desulfurizing agent or medium from the combustion chamber I to the regeneration chamber II may be carried out employing a horizontally placed perforated plate, and a gas injection nozzle opened onto the regeneration chamber in place of the above-mentioned inclined perforated plate 10. Further, it is also possible to mix a part of the exhaust gas discharged through a pipe 26 of the regeneration chamber II into the gas fed through the pipe 22 to effect gas recirculation and thereby adjust the level of the fluidized bed 8. The fuel feed pipe 18 is not necessary to be passed through the gas box 14, but may be provided on the lateral wall of the hollow body 1. Further, the air feed pipe 20 may be provided at the bottom part of the hollow body 1. Still further, the fuel feed pipe 18 may not be provided, but a mixture of fuel with air may be fed through the air feed pipe 20.

According to the apparatus shown in FIG. 1, since the desulfurization chamber is partitioned from the regeneration chamber by a partition wall, and the desulfurizing agent is automatically circulated through the openings 2 and 4, a piping which connects a desulfurization column to a regeneration column, and power for transferring the desulfurizing agent, as required in conventional apparatuses, are not necessary; further the apparatus is made simple and compact; and still further it is possible to reduce the heat loss brought by heat dissipation of the desulfurizing agent or the fluidized medium.

Figure 2:
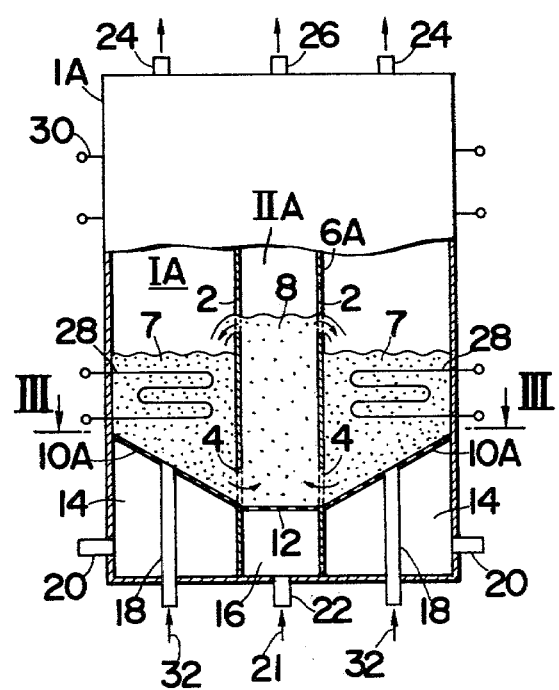
FIG. 2 is an elevational section view of another embodiment of a fluidized bed combustor in accordance with the present invention.
Figure 3:
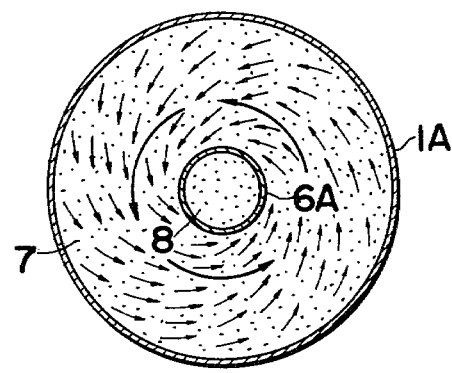
FIG. 3 is a schematic cross-sectional view taken along the line III—III of FIG. 2.

In an apparatus of FIG. 2, the body 1A of the apparatus consists of a cylindrical one, inside which a cylindrical partition wall 6A is provided to form a double cylinder, and a combustion chamber IA is formed outside the partition wall 6A, while a regeneration chamber IIA is formed inside the wall. Further, a perforated plate 10A provided outside the cylindrical partition wall 6A is bored so that the respective holes of the plate are directed towards the tangential direction to the respective concentric circles on which the holes are located to cause the combustion gas to form a swirling stream as shown by arrow marks in FIG. 3.

According to the above apparatus, the desulfurizing agent or medium is automatically circulated through the openings 2 and 4, from the combustion chamber IA to the regeneration chamber IIA and further from the regeneration chamber IIA to the combustion chamber IA, as mentioned above. However, since the combustion gas forms a swirling stream, fuel, air, combustion gas, and desulfurizing agent are sufficiently mixed together, and also the separation due to the difference in the specific gravity in the fluidized bed 7 is promoted. Further, such advantages are brought about that since the regeneration chamber IIA is enclosed by the combustion chamber IA, temperature maintenance is easy, and further since the shape of the whole apparatus is cylindrical, a smaller area for installation of the apparatus may be required.

Figure 4:
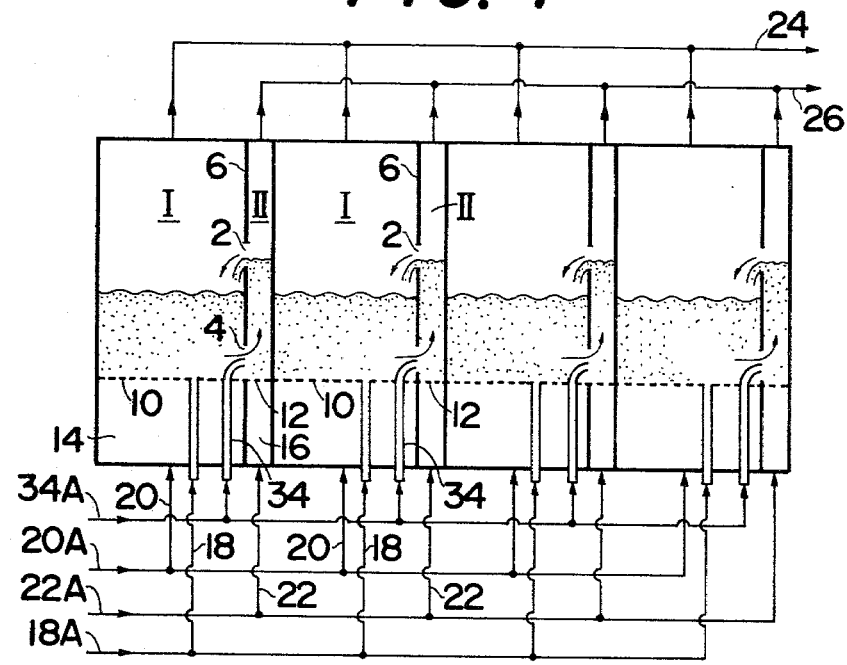
FIG. 4 is a schematic sectional view of an embodiment of a combustor according to the present invention, wherein a plurality of constituent units each consisting of a combustion chamber and a regeneration chamber are arranged in parallel.

In FIG. 4, a plurality of constituent units each corresponding to the apparatus of FIG. 1 are arranged in parallel, as mentioned above. In this apparatus, however, the perforated plate is not inclined, but horizontally arranged, and further, a gas-spouting pipe 34 for transferring the desulfurizing agent from the combustion chamber I to the regeneration chamber II, is arranged so as to penetrate through a gas box 14 and the perforated plate 10 and further to extend to the opening 4 of the regeneration chamber II. A fuel is fed into the inside of the combustion chamber I through a line 18 branched from a line 18A, and combustion air is also fed thereinto through a line 20 branched from a line 20A, the gas box 14, and the perforated plate 10. Further, a gas for transferring the medium is fed to the gas-spouting pipe 34 branched from a line 34A. A regenerating gas is fed into the regeneration chamber II through a line 22 branched from a line 22A, a gas box 16, and a perforated plate 12. As the gas for transferring the medium, the same gas as the regenerating gas may be employed.

According to the above-mentioned apparatus, wherein the respective units each consisting of the combustion chamber I and the regeneration chamber II are arranged in parallel, since the openings 2 and 4 for circulating the desulfurizing agent are both provided on the same partition wall 6 on the going way and the returning way therefor, such a problem is raised that a short circuiting flow is liable to occur, whereby a portion of the desulfurizing agent is not subjected to desulfurization reaction and regeneration reaction to reduce the efficiency.

Figure 5:
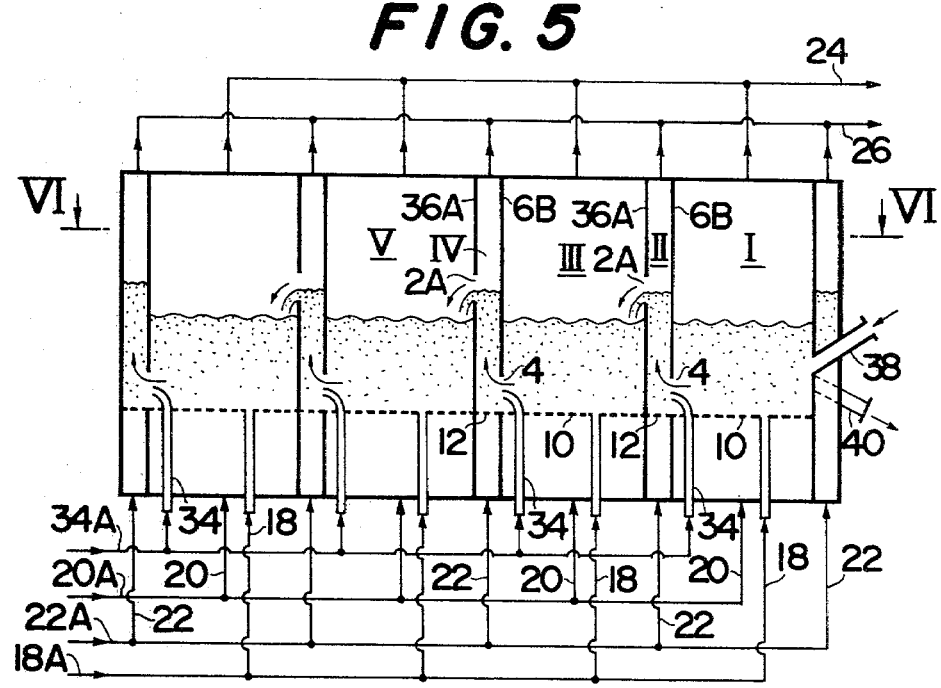
FIG. 5 is a schematic sectional view of an improved embodiment over the apparatus of FIG. 4 wherein a plurality of the units are arranged such that the desulfurizing agent successively flows in series through the units.

In FIG. 5 illustrating an improved apparatus over that of FIG. 4, an opening 2A is provided on a partition wall 36A partitioning the adjacent constituent units, in place of the upper opening part 2 provided on the partition wall 6 partitioning the combustion chamber I and the regeneration chamber II of FIG. 4, and the medium in a regeneration chamber II of a constituent unit is overflown into a desulfurization chamber III of a constituent unit adjacent to the above-mentioned one. The desulfurizing agent (medium) is, as shown by arrow marks, fed into a combustion chamber I through an inlet 38; after absorbing sulfur oxides contained in the combustion gas, transferred into the regeneration chamber II through a lower opening 4 provided in a partition wall 6B, and regenerated in the chamber II; then overflown through an opening part 2A provided in the partition wall 36A and fed into a combustion chamber III of the adjacent constituent unit; fed into a combustion chamber V of the next unit via a regeneration chamber IV; and after successive repetitions of the desulfurization reaction and the regeneration reaction, in the abovementioned order, discharged through an exit 40 of the regeneration chamber of a final unit.

Figure 6:
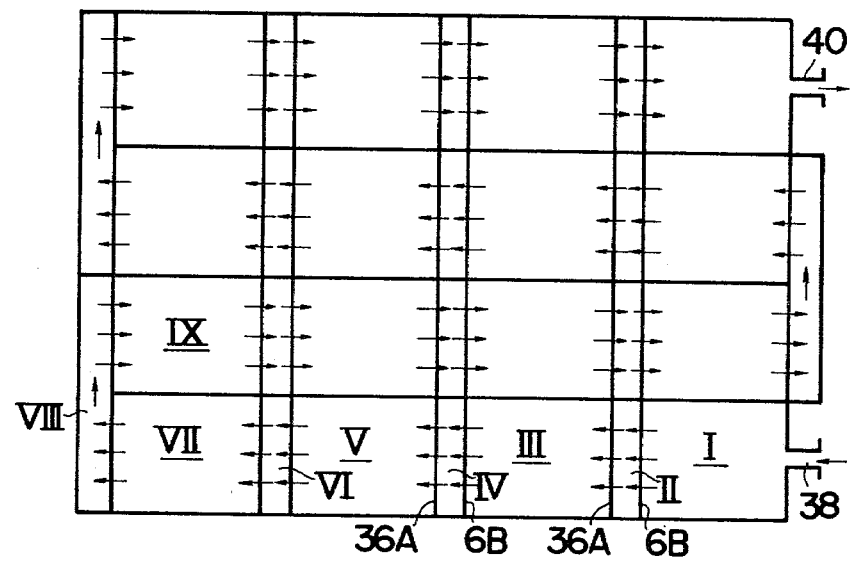
FIG. 6 is a schematic sectional view taken along the lines VI—VI of FIG. 5.

In an apparatus of FIG. 5, wherein the four units arranged in series are further arranged in four parallel rows as shown in FIG. 6, the regeneration chamber (e.g. VIII) of a transition unit from a row to another is extended so as to be adjacent to the combustion chamber of the next row.

Figure 7:
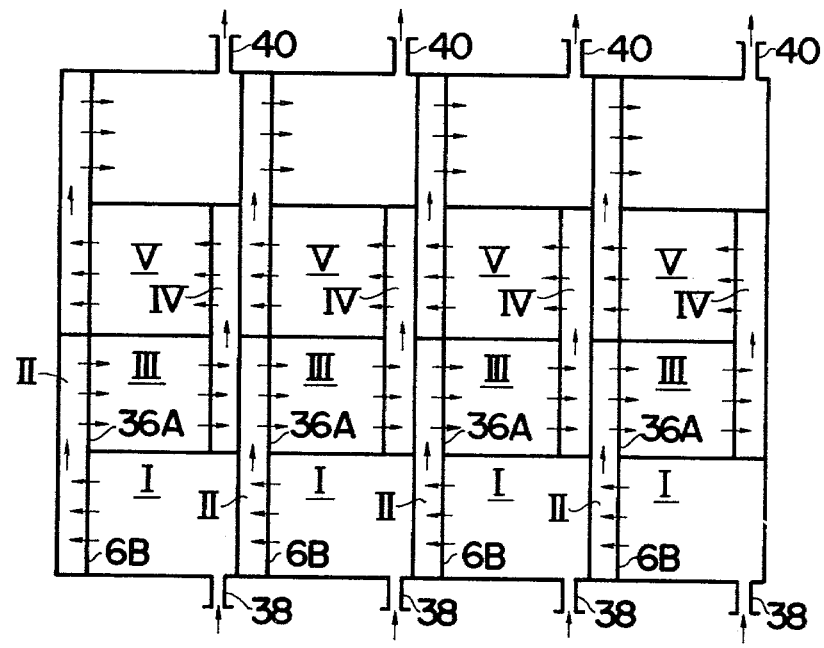
FIG. 7 is a plan sectional view of another embodiment of a combustor in accordance with the present invention wherein the units of FIG. 6 each consisting of a combustion chamber and a regeneration chamber are arranged in another manner.

In an apparatus of FIG. 7, the regeneration chamber of one unit is made common to that of an adjacent unit to thereby cause the medium to form a flow path of a S-letter shape and to successively repeat desulfurization and regeneration. The flow of the medium (desulfurizing agent) is shown by arrow marks in FIG. 7.

According to the above-mentioned embodiments, no return of the flow occurs in the combustion chamber and the regeneration chamber, and the medium in the same chamber is forwarded in one direction, whereby the transfer and replacement of the medium are fully carried out to make it possible to prevent the short-circuiting flow of the medium from occurrence. Thus the percentage desulfurization and the regeneration efficiency may be increased by e.g. about 20%, respectively.

Further, in the above-mentioned embodiments, it is also possible to connect the discharge pipe 40 of the desulfuring agent to the feed pipe 38 to thereby utilize the desulfurizing agent in a recirculation manner.

In apparatuses of FIG. 8 and FIG. 9 wherein the desulfurizing agent is self-circulated between a combustion chamber and a regeneration chamber to form a closed loop of flow, a housing 42 is partitioned into 4 chambers consisting of combustion chambers I and III and regeneration chambers II and IV, and the medium is, as shown by arrow marks, passed through the combustion chamber I, the regeneration chamber II, the combustion chamber III, and the regeneration chamber IV, and returned to the original combustion chamber I. Gas feeds to and gas discharges from the respective chambers, and transfer of the medium between the respective chambers are carried out in the same manner as mentioned referring to FIG. 5. Such a unit may be employed as an assembly consisting of a plurality of units.

Figure 10:
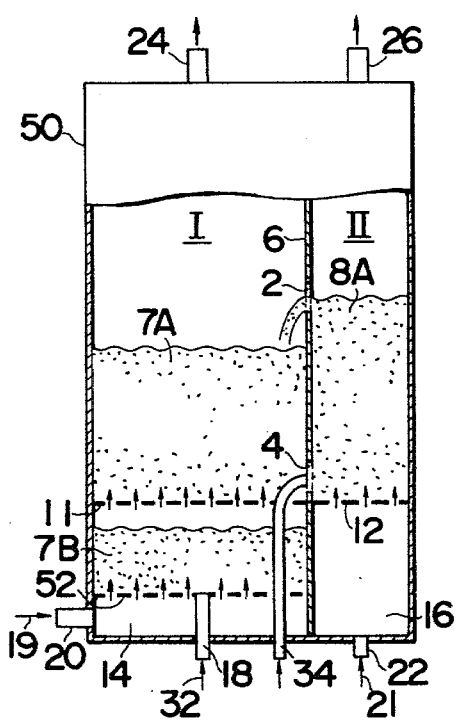
FIG. 10 is an elevational section view of an embodiment of the combustor in accordance with the present invention wherein two stages of fluidized beds are provided in a combustion chamber.

In an apparatus of FIG. 10, a first stage fluidized bed 7B and a second stage fluidized bed 7A are provided in a combustion chamber I, and complete combustion of fuel is carried out in the first bed 7B, while desulfurization of sulfur oxides contained in the combustion gas of the first bed 7B is carried out in the second bed 7A.

The desulfurization reaction of the combustion gas occurs only under a condition where sulfur oxides, desulfurizing agent, and a definite amount of oxygen are coexistent, as shown by the above-mentioned equation (1). Thus, no desulfurization reaction occurs at the part where fuel has been burnt to form a reducing atmosphere. In the case of the fluidized bed where combustion of fuel and desulfurization of sulfur oxides are carried out at the same time, such a reducing atmosphere is locally formed and results in reducing the percentage desulfurization. This fact is particularly notable when the amount of surplus oxygen in the desulfurization reaction is small.

On the other hand, the amount of nitrogen oxides ($NO_x$) formed by the combustion in the combustor such as a fluidized bed combustion steam generator varies depending on the kinds of coal, combustion temperature, etc.. In the case where coal, heavy oil or the like is burnt in the fluidized bed combustion steam generator, the combustion temperature is lowered as much as 800° to 1000° C., as compared with the case where it is directly burnt. Hence, although the amount of so-called thermal $NO_x$ is small, it is impossible to avoid occurrence of fuel $NO_x$ which should be reduced.

Figure 11:
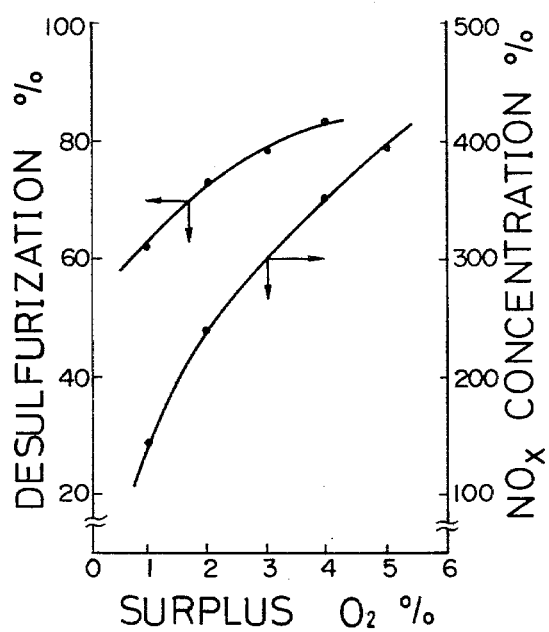
FIG. 11 is a diagram for illustrating a relationship between the concentration of surplus oxygen and the percentage desulfurization or the concentration of $NO_x$ in a desulfurizing combustion chamber inside the combustor of the present invention.

FIG. 11 illustrates the relationship between the concentration of surplus oxygen in the desulfurizing combustion and the percentage desulfurization or $NO_x$ concentration in the fluidized bed combustion steam generator. The concentration of surplus oxygen abovementioned is defined as the amount of oxygen in excess of that required for complete combustion of fuel. As for the feeds, coal powder was employed as the fuel and limestone powder was employed as the regenerating agent; limestone was continuously fed while the amounts of limestone and coal fed were adjusted so as to give a molar ratio of limestone to coal of 4:1; and they were mixed together to form a fluidized bed.

As is apparent from FIG. 11, if the concentration of surplus oxygen is reduced in order to inhibit the amount of $NO_x$ formed, a local reducing atmosphere occurs to reduce the percentage desulfurization, as mentioned above.

Figure 12:
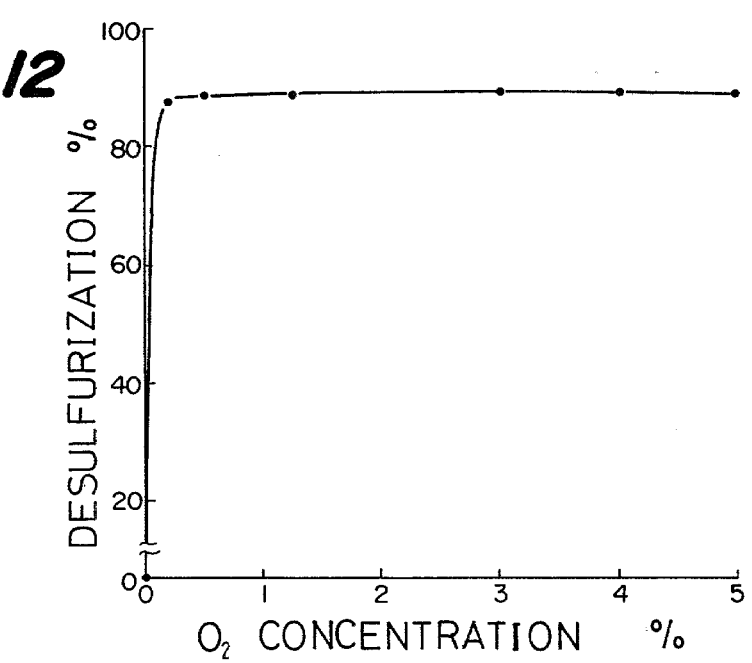
FIG. 12 is a diagram for illustrating a relationship between the oxygen concentration in a sample gas prepared so as to correspond to the combustion gas of the combustor according to the present invention, and the desulfurizing performance.

FIG. 12 shows a relationship between the oxygen concentration in a sample gas prepared so as to correspond to the combustion gas of a fluidized bed combustor and subjected to desulfurization treatment, and the desulfurizing performance.

Referring to this desulfurization experiment, limestone having an average of particle diameters of 1.5 mm was fed into a reaction tube having a diameter of 80 mm so as to give a molar ratio of limestone to sulfur contained in the sample gas, of 4:1, and also a sample gas containing 1600 ppm of $SO_2$, 12% by volume of $CO_2$, 10% by volume of $H_2O$, and definite amounts of $O_2$, was heated to 900° C. and then fed into the desulfurizing layer, followed by fluidizing the desulfurizing layer to carry out desulfurization.

As is apparent from FIG. 12, if no oxygen is present, no desulfurization reaction occurs, but if the concentration of oxygen is about 0.2% or higher, an almost unchanged high percentage desulfurization is obtained. In such a state that no local reducing atmosphere due to the combustion is present as mentioned above, it can be seen that desulfurization reaction proceeds well as far as a small amount of oxygen is present.

The embodiment of FIG. 10 is so devised based upon the above-mentioned experimental results that combustion of fuel and desulfurization of combustion gas are carried out in different fluidized beds to obtain a high percentage desulfurization under the inhibition of $NO_x$ formation.

In FIG. 10, a vessel 50 is partitioned by a partition wall 6 into a combustion chamber I and a regeneration chamber II, and a fluidized bed 7A is formed on a perforated plate 52, in the combustion chamber I. A heat transfer medium containing a desulfurizing agent is fluidized in the fluidized bed 7A, while a heat transfer medium having no desulfurizing function such as sand is fluidized in the fluidized bed 7B. Air 19 for the combustion and desulfurization is introduced through an air feed pipe 20, via a gas box 14 and then the perforated plate 52 into the fluidized bed 7B, and fuel 32 is fed through a pipe 18 into the fluidized bed 7B. The amount of air fed through the pipe 20 is in the range in which the fuel fed through the pipe 18 is completely burnt but surplus oxygen is small, and concretely the concentration of such surplus oxygen is in the range of about 0.2 to about 3%, preferably 0.5 to 2.5%. If the concentration of surplus oxygen is lower than about 0.2%, the desulfurizing performance becomes inferior, while if it exceeds about 3%, the amount of $NO_x$ generated increases remarkably. Thus the fuel is completely burnt in the fluidized bed 7B of the first stage where the amount of $NO_x$ generated is reduced since the amount of surplus oxygen is small. Next, a high temperature combustion gas in the fluidized bed 7B ascends, passes through the perforated plate 11, and reaches the second fluidized bed 7A where $SO_x$ contained in the combustion gas is absorbed and removed by a desulfurizing agent in the fluidized bed 7A. Since a desulfurization reaction alone occurs in the fluidized bed 7A, a high percentage desulfurization can be obtained even in a low oxygen concentration. The desulfurizing agent in the fluidized bed 7A is then introduced through an opening 4 of the partition wall 6 into a fluidized bed 8A and regenerated by a regenerating gas 21 introduced through a pipe 22, a gas box 16 and a perforated plate 12, and thereafter over-flown through an opening part 2 and circulated again into the fluidized bed 7A in the combustion chamber II. In FIG. 10, pipe 34 is a gas-spouting pipe for transferring the desulfurizing agent in the fluidized bed 7A to the regeneration chamber II. By dividing the fluidized bed in the combustion chamber I into two stages of 7A and 7B and separating the combustion of fuel from the desulfurization of combustion gas as mentioned above, it is possible to increase the percentage desulfurization from 62% up to 87% in the case where the $NO_x$ concentration in the combustion gas is 90 ppm, for example.

Figure 13:
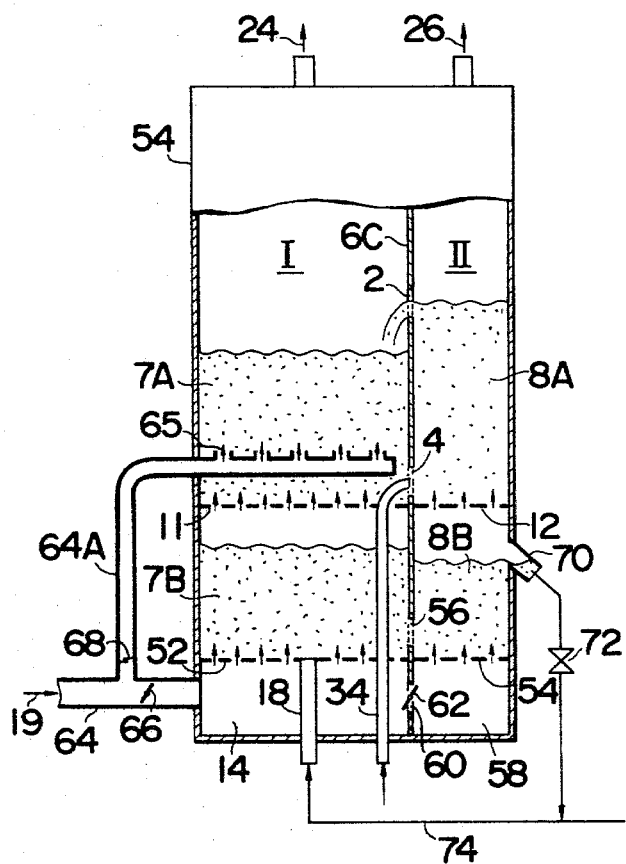
FIG. 13 is an elevational section view of an embodiment of the combustor in accordance with the present invention wherein a desulfurization chamber and a regeneration chamber are each composed of an upper fluidized bed and a lower one, and desulfurization of the combustion gas and regeneration and circulation of the medium as shown in FIG. 4 are carried out in the upper fluidized beds, while fuel is burnt in a poor oxygen atmosphere in the lower fluidized beds, to produce in situ a regenerating gas to be fed to the upper regeneration chamber.

FIG. 13 shows another embodiment of the present invention wherein the desulfurizing chamber and the regeneration chamber are composed respectively of an upper fluidized bed and a lower one, and desulfurization of the combustion gas and regeneration and circulation of the medium as shown in FIG. 4 are carried out in the upper fluidized beds, while fuel is burnt in a poor oxygen atmosphere in the lower fluidized beds, to produce in situ a regenerating gas to be fed to the upper regeneration chamber. The vessel 54 is partitioned by a partition wall 6C into a combustion chamber I and a regeneration chamber II, and fluidized beds 7A and 7B are formed on perforated plates 11 and 52 in the combustion chamber I, respectively, while fluidized beds 8A and 8B are formed on perforated plates 12 and 54 in the regeneration chamber, respectively. The partition wall is provided with an opening 2 for overflowing the medium regenerated in the fluidized bed 8A into the fluidized bed 7A; an opening 4 communicating from the fluidized bed 7A to the fluidized bed 8A; for opening 56 communicating from the fluidized bed 7B to the fluidized bed 8B; and an opening 60 equipped with a damper, communicating from a gas box 14 below the perforated plate 52 to a gas box 58 below the perforated plate 54. A main piping 64 for feeding combustion air is connected to the gas box 14 and also has a branch piping 64A opened into the fluidized bed 7A. The main piping 64 is equipped with a damper 66 and the branch piping 64A is equipped with a damper 68. Further, a fuel feed pipe 18 is opened into the fluidized bed 7B, and a gas feed pipe 34 for transferring the desulfurizing agent from the fluidized bed 7A to the fluidized bed 8A is opened into the opening 4 of the partition wall 6C. A pipe 70 for discharging unburnt fuel is opened to the fluidized bed 8B in the regeneration chamber II.

In the above-mentioned apparatus, a portion of the air 19 for combustion is fed through the damper 68, the branch piping 64A and nozzles 65 into the fluidized bed 7A, while another portion thereof is fed through the damper 66 and the gas box 14 into the fluidized bed 7B. In this case, the amount of air fed to the lower fluidized bed 7B is adjusted by the damper 66 so that it is less than the theoretical amount of air required for the combustion of the fuel fed through a pipe 18. On the other hand, the amount of air fed to the upper fluidized bed 7A is adjusted by the damper 68 so that it is in excess (for example, by about 10 to 20%) of the above-mentioned theoretical amount of air required for the combustion of the fuel. Thus, a reducing atmosphere is formed in the fluidized bed 7B and the fluidized bed 8B communicating thereto, and partly heat-decomposed fuel is transferred through the opening 56 into the lower fluidized bed 8B, where the fuel reacts with air fed through the damper 62, the gas box 58 and the perforated plate 54 to generate a regenerating gas (e.g. CO), and also heat required for regeneration is imported through the heat generation due to the thermal decomposition of the fuel. Unburnt fuel over flows through the pipe 70 opened to the fluidized bed 8B, and flows via a valve 72 to a fuel feed line 74 where a fresh fuel is joined together. Then the mixed fuel is circulated through the pipe 18 into the fluidized bed 7B. By adjusting the valve 72, it is possible to control the heat generation due to the thermal decomposition and the formation of reducing gas in the fluidized 8B. On the other hand, air in an excess amount to the theoretical value required for the combustion is fed through the piping 64A into the fluidized bed 7A of the combustion chamber I, where combustion of thermal decomposed gas and unburned fuel ascending through the perforated plate 11 is carried out; at the same time, sulfur oxides contained in the combustion gas are absorbed and removed by the desulfurizing agent contained in the bed 7A. Since spent desulfurizing agent has increased in it's specific gravity as mentioned above, it descends to the lower part of the fluidized bed 7A and transferred through the opening 4 into the fluidized bed 8A of the regeneration chamber II, while accompanying the spouted gas fed through the gas feed pipe 34. On the other hand, the above-mentioned regenerating gas is fed through the perforated plate 12 into the fluidized bed 8A, where the desulfurizing agent is regenerated, thereafter oerflows through the opening 2 and is circulated into the fluidized bed 7A. The respective exhaust gases in the chamber I and the chamber II are discharged through a pipe 24 and a pipe 26 to the outside, respectively.

According to the above-mentioned embodiment, the regenerating gas to be fed to the fluidized bed 8A in the regeneration chamber 8A is formed in the fluidized beds 7B and 8B, and also the desulfurizing agent is used by circulation between the fluidized beds 7A and 8A as mentioned above, whereby it becomes unnecessary to provide outside an apparatus, a feed source, a feed pipe, etc. for a regenerating gas, and an apparatus for regenerating the desulfurizing agent, as well as it is possible to reduce the heat loss of the apparatus.

Figure 14:
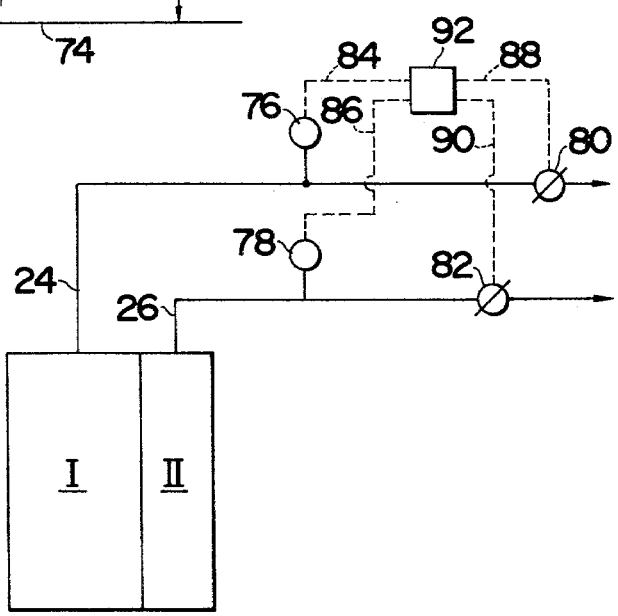
FIG. 14 is a block diagram illustrating a method for controlling the respective pressures in a combustion chamber and a regeneration chamber of the combustor according to the present invention.

FIG. 14 illustrates a method for controlling the respective pressures in the combustion chamber I and the regeneration chamber II of the apparatus according to the present invention. In the regeneration chamber II, sulfur dioxide is formed by the reaction of calcium sulfate and carbon monoxide, as shown in the equation (2). If a gas containing this sulfur dioxide is introduced through the opening of a partition wall into the combustion chamber I, it has a bad effect upon the reactions of desulfurization and combustion in the combustion chamber I. Thus it is preferable to keep the pressure of the combustion chamber high to such an extent that circulation of the desulfurizing agent is not harmed.

In FIG. 14, a pressure detector 76 and a damper 80 are provided on a pipeline 24 for the exhaust gas from the combustion chamber I, and a pressure detector 78 and a damper 82 are provided on a pipeline 26 for the exhaust gas from the regeneration chamber II, and they are connected to a controlling device 92 by control lines 84, 86, 88, and 90. The pressure detectors 76 and 78 detect the pressures on the pipelines 24 and 26, and transmit detection signals to the controlling device 92. The controlling device having received such pressure signals sends, in turn, signals to the dampers 80 and 82 via control lines 88 and 90, and controls the opening degree of these dampers, so that the pressure of the exhaust gas on the pipeline 24 is controlled to be higher than that on the pipeline 26. These controls are automatically carried out, and thus it is possible to prevent a SO₂ rich gas formed in the regeneration chamber II, from flowing in the combustion chamber I.

It should be apparent that the above described embodiments are merely illustrative of but a few of the many possible embodiments which represent the applications of the principles of the present invention. Numerous and varied other arrangements can be readily devised by those skilled in the art without departing from the scope of the present invention.

What is claimed is:
1. A fluidized bed combustor which comprises:
a hollow body containing a combustion chamber and regeneration chamber formed by vertically partitioning said hollow body by a partition wall;
a perforated plate provided at the bottom of said combustion chamber and a perforated plate provided at the bottom of said regeneration chamber;
a particulate solid heat transfer medium containing a combustion gas desulfurizing agent means that will associate with the sulfur of sulfur oxide gas to produce a sulfur-containing medium, said medium to be fluidized and arranged on each of said perforated plates;
means for feeding fuel to said combustion chamber;
means for feeding air for combustion of the fuel and fluidization of said heat transfer medium to said combustion chamber to form a fluidized bed of said heat transfer medium in said combustion chamber;
means for feeding a gas that will cause disassociation of said combined sulfur from said medium and produce a sulfur-containing gas for regeneration of said heat transfer medium and fluidization of said heat transfer medium to said regenerating chamber to form a fluidized bed of said heat transfer medium in said regeneration chamber;
gas-discharging port means provided at the upper part of said combustion chamber for discharging products of combustion of said fuel and gas-discharging port means provided at the upper part of said regeneration chamber for discharging said sulfur-containing gas;
said partition wall having an upper opening and a lower opening;
said lower opening being located in the vicinity of said perforated plates;
means for transferring said heat transfer medium from said combustion chamber through said lower opening to said regeneration chamber; and said upper opening being located above the level of said fluidized bed formed in said combustion chamber and below the level of said fluidized bed in said regeneration chamber so that said heat transfer medium containing desulfurizing agent means can overflow through said upper opening and recycle from said regeneration chamber to said combustion chamber.

2. A fluidized bed combustor according to claim 1 wherein said means for transferring said heat transfer medium from said combustion chamber through said lower opening to said regeneration chamber is a gas-spouting pipe having an outlet located at said lower opening and directed towards said regeneration chamber.

3. A fluidized bed combustor according to claim 1 wherein said gas-discharging ports for the exhaust gases discharged from said combustion chamber and regeneration chamber are provided with a pressure detector and a valve, and also control means for adjusting the divergence of said valves so that the pressure in said reaction chamber is higher than that in said regeneration chamber.

4. A fluidized bed combustor according to claim 1 wherein said heat transfer medium is selected from the group consisting of sand, limestone, quick lime, slaked lime, dolomite, magnesium carbonate, magnesium oxide, cement clinker and mixtures thereof.

5. A fluidized bed combustor according to claim 1 wherein said desulfurizing agent is selected from the group consisting of limestone, quick lime, slaked lime, dolomite, magnesium carbonate, magnesium oxide, cement clinker and mixtures thereof.

6. A fluidized bed combustor according to claim 1 wherein said gas for regeneration is selected from the group consisting of carbon monoxide, hydrogen, steam, air and mixtures thereof.

* * * * *